F. J. CLEARY.
CROSS LINE ADJUSTING MEANS FOR SIGHTING TELESCOPES.
APPLICATION FILED MAY 1, 1913.
1,086,141.  Patented Feb. 3, 1914.
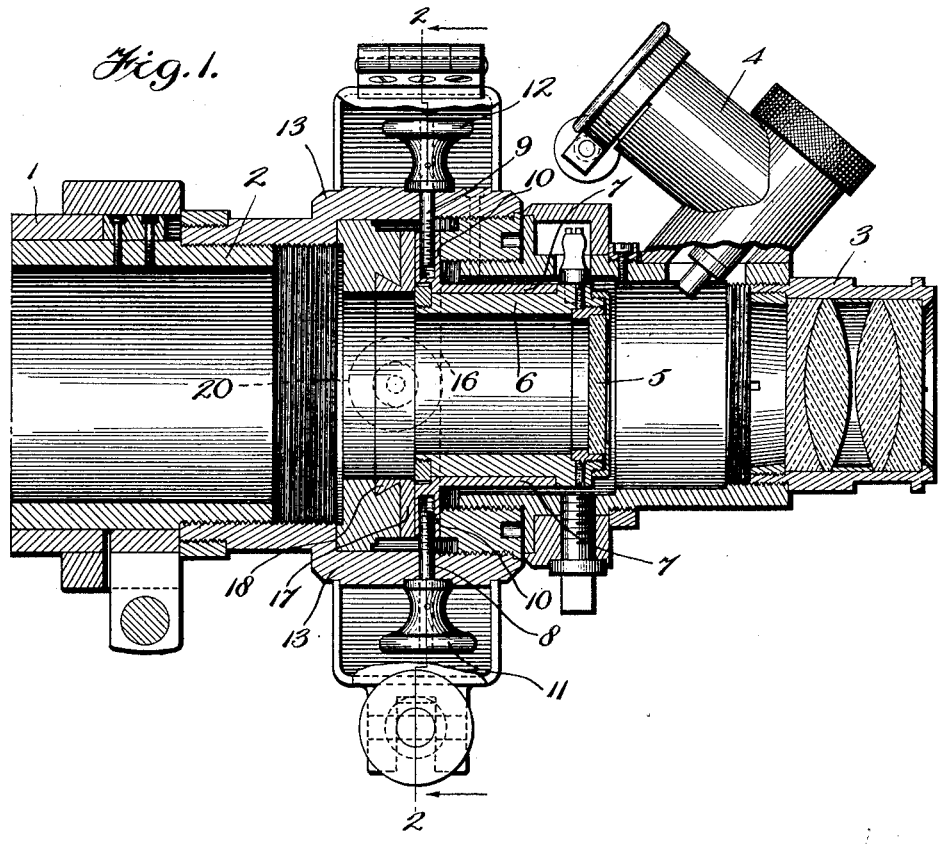
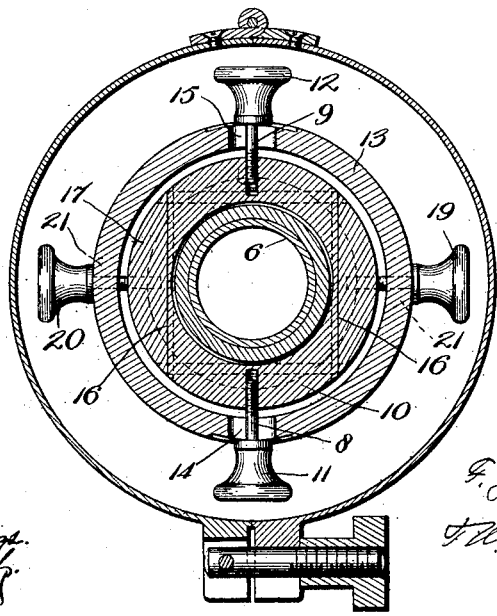

UNITED STATES PATENT OFFICE.

FRANCIS J. CLEARY, OF WASHINGTON, DISTRICT OF COLUMBIA.

CROSS-LINE-ADJUSTING MEANS FOR SIGHTING-TELESCOPES.

1,086,141. Specification of Letters Patent. Patented Feb. 3, 1914.

Application filed May 1, 1913. Serial No. 764,827.

*To all whom it may concern:*

Be it known that I, FRANCIS J. CLEARY, lieutenant, U. S. Navy, a citizen of the United States, residing at Washington, in the District of Columbia, have invented certain new and useful Improvements in Cross-Line-Adjusting Means for Sighting-Telescopes; and I do hereby declare the following to be a full, clear, and exact description of the invention, such as will enable others skilled in the art to which it appertains to make and use the same.

This invention relates to a means for adjusting the cross lines in sighting telescopes especially adapted for naval guns, and has for its object to improve and render more efficient the adjusting means heretofore proposed for the same purpose.

With these and other objects in view the invention consists in the novel details of construction and combinations of parts more fully hereinafter disclosed and particularly pointed out in the claims.

Referring to the accompanying drawings forming a part of this specification in which like numerals designate like parts in all the views: Figure 1 is a longitudinal sectional view of the eye piece end of a sighting telescope provided with my invention; and Fig. 2 is a cross section on the line 2—2 of Fig. 1.

Telescopes of this nature are usually provided with means for moving the cross lines horizontally and vertically for the purpose of obtaining a parallelism of the line of collimation of the telescope and the axis of the bore of the gun, and in most of the telescopes heretofore used, this adjustment has been obtained by four screws with slotted ends. These screws were sunk into recesses and rested against the edges of the dovetailed slides carrying the mount for the cross line lens. These screws were actuated by a screwdriver, only one screw could be reached at a time, and then only by the observer removing his eye from the eyepiece each time to find the screw hole or by having a second man manipulate the screw driver while being directed by the observer. In addition, as the adjusting screws only rested against the edges of the dovetailed adjusting plates instead of actually entering said plates, the control of the cross line adjustment by the adjusting screws was not positive, as slacking back on one screw would not cause any corresponding back movement of the cross lines. A back movement could be had only when the opposite screw of a pair was set up. These various objections made boresighting of these telescopes a tedious and nerve racking operation, all as is well known. In my invention on the other hand, these faults are overcome and the adjustment of the cross lines made positive in both directions as well as simple and easy as will now appear.

1 indicates the barrel of a sighting telescope, 2 a tube in which may be mounted an erecting system (not shown), 3, the usual eye piece, 4 a lighting means, 5 any suitable means for carrying the cross lines, 6 a sleeve or carrier for the means or plate 5, and 7 a ring carrier for the said carrier 6. The carrier 6 is rotatably mounted in the ring carrier as shown for the purpose of moving the cross lines in their own plane; and the said ring carrier 7 is positively movable transversely of the axis of the telescope by the adjusting screws 8 and 9 which enter the flange 10 of said ring carrier, and are provided with the heads 11 and 12 respectively which project out beyond the housing 13 through the slots 14 and 15.

The flange 10 of the ring carrier 7 is guided in its transverse movements by the guide edges 16, Fig. 2, carried by a ring 17 having a dove tailed extension 18 providing a transverse movement at right angles to the movement of the flanges 10. The ring 17 is positively adjusted backward and forward by each of the hand operated screws 19 and 20, which may pass through slots 21 in the housing 13, and which have a screw threaded engagement with said ring 17 as will be readily understood.

In the operation of my invention when it is desired to adjust the cross lines, it is only necessary, while looking at a distant object, to tighten up on one of the adjusting screw heads 11 or 12, in order to move the intersection of said lines across the axis of the instrument, while loosening up on the other, and if said intersection should be moved too far, the screw heads are readily reversed until the desired position in one plane is attained. The other pair of screw heads 19 and 20 are next manipulated in the same way until said intersecting point is properly located in a plane at right angles to the first plane, when the complete adjustment is had.

It will thus be seen that in this invention, the slotted adjusting screws which, in the old style telescopes engaged in a thread in the housing and rested against the edges of the dovetailed adjusting plates have been replaced by thumb screws which engage in threads in the dovetailed adjusting plates and simply pass through holes or slots in the housing. These said thumb screws preferably have a shoulder which takes against a seat on the outside of the housing as shown. The observer can easily adjust the cross lines without removing his eye from the eye piece by grasping the two opposing screws by the fingers of his two hands and rotating them in the same direction.

The advantage is obvious of avoiding the above annoyances incident to the old style adjustment, by enabling the observer to simply grasp opposing thumb screws and thereupon adjust the cross lines without removing his eye from the object.

It is obvious that those skilled in the art may vary the arrangement of parts without departing from the spirit of my invention, and therefore, I do not wish to be limited to the above disclosure except as may be required by the claims.

What I claim is:—

1. In a sighting telescope provided with cross-lines, the combination of a movable support for said lines; a plurality of adjusting means capable of being readily grasped by the fingers each coupled to said support and each adapted to positively move said support in opposite directions transversely of the axis of the telescope; and an independent adjusting means comprising a plurality of members also adapted to be grasped by the fingers and each capable of positively moving said support in opposite directions at an angle to said first mentioned directions, substantially as described.

2. In a sighting telescope provided with cross lines the combination of a sleeve for supporting said lines; a ring carrier in which said sleeve is mounted; a housing for said sleeve and carrier; and oppositely disposed thumb screws passing through said housing and into said sleeve and each adapted to readily and positively adjust said carrier, sleeve, and lines in opposite directions transversely of said telescope, substantially as described.

3. In a sighting telescope provided with cross lines the combination of a sleeve for supporting said lines; a ring carrier in which said sleeve is mounted; a housing for said sleeve and carrier; oppositely disposed thumb screws passing through said housing and into said sleeve and each adapted to readily and positively adjust said carrier, sleeve and lines in opposite directions transversely of said telescope; a ring provided with guide edges for said carrier; and oppositely disposed thumb screws entering said ring and each adapted to positively adjust said carrier in opposite directions at right angles to said first mentioned directions, substantially as described.

4. In a sighting telescope provided with cross lines, the combination of a sleeve for rotatably adjusting said lines in their own plane; a ring carrier for said sleeve; a housing provided with slots; oppositely disposed adjusting thumb screws passing through said slots and into said ring carrier; a ring provided with guide edges for said ring carrier; a dove-tail extension rigid with said ring; and oppositely disposed thumb screws also passing through said housing and into said ring, for positively moving the latter in opposite directions, substantially as described.

In testimony whereof I affix my signature in presence of two witnesses.

FRANCIS J. CLEARY.

Witnesses:
T. A. WITHERSPOON,
HENRY E. COOPER.

Copies of this patent may be obtained for five cents each, by addressing the "Commissioner of Patents, Washington, D. C."